(12) United States Patent
Armstrong et al.

(10) Patent No.: US 9,894,828 B1
(45) Date of Patent: Feb. 20, 2018

(54) GARDEN TOOL ADAPTER FOR PUNCHING HOLES FOR SEEDS AND METHOD FOR USE

(71) Applicant: Seederator, LLC, Las Vegas, NV (US)

(72) Inventors: John Armstrong, Las Vegas, NV (US); Mark Armstrong, Las Vegas, NV (US)

(73) Assignee: Seederator, LLC, Las Vegas, NV (US)

( * ) Notice: Subject to any disclaimer, the term of this patent is extended or adjusted under 35 U.S.C. 154(b) by 0 days.

(21) Appl. No.: 15/210,879

(22) Filed: Jul. 14, 2016

(51) Int. Cl.
*A01B 45/00* (2006.01)
*A01C 5/02* (2006.01)
(52) U.S. Cl.
CPC ..................................... *A01C 5/02* (2013.01)
(58) Field of Classification Search
CPC ............... A01C 5/02; A01C 5/05; A01C 7/02
USPC ..... 111/92, 99; 172/362, 364, 371, 377–379
See application file for complete search history.

(56) References Cited

U.S. PATENT DOCUMENTS

| 5,871,058 | A | * | 2/1999 | Naccarato | A01B 1/00 172/371 |
| 8,347,797 | B1 | * | 1/2013 | Clay | A01C 5/02 111/92 |
| 2009/0294143 | A1 | * | 12/2009 | Walker | A01C 5/02 172/548 |
| 2011/0061882 | A1 | * | 3/2011 | Broadstone | A01C 5/02 172/362 |

FOREIGN PATENT DOCUMENTS

DE 202015005416 U1 * 9/2015 ............... A01C 5/02
WO WO 02051239 A1 * 7/2002 ............... A01C 5/02

* cited by examiner

*Primary Examiner* — Tara Mayo-Pinnock
(74) *Attorney, Agent, or Firm* — Shifrin Patent Law; Dan Shifrin

(57) ABSTRACT

A garden tool adapter is provided for punching holes for seeds. The adapter comprises an elongated tube having male threads on each end and a plurality of spaced apart openings formed therethrough, a pair of end caps having female threads corresponding to the male threads, and an optional plurality of spacers configured to fit onto prongs of a garden tool. The openings in the elongated tube configured to receive the prongs of the garden tool after which the elongated tube is pushed against the spacers, if used, and the end caps tightened against the outer surface of outer prongs.

5 Claims, 5 Drawing Sheets

GARDEN TOOL ADAPTER FOR PUNCHING HOLES FOR SEEDS AND METHOD FOR USE

TECHNICAL FIELD

The present invention relates generally to gardening and, in particular, to punching holes in the ground for seeds.

BACKGROUND ART

Putting seeds in holes in the ground, while slower, provides a better place for germinating than scattering seeds on top of the ground. Birds and other animals are less likely to eat the seeds, the seeds are less likely to wash away before they have taken root, and the plants tend to grow deeper roots, making them more drought tolerant. However, powered machines are heavy, expensive to own or rent, and may be overkill for small plots. Manually making holes in the ground is time consuming, labor intensive, fatiguing, and may result in holes of inconsistent depths.

SUMMARY OF THE INVENTION

Embodiments of the present invention provide a garden tool adapter for punching holes for seeds and a method for its use. The adapter comprises an elongated tube having male threads on each end and a plurality of spaced apart openings formed therethrough, a pair of end caps having female threads corresponding to the male threads, and, optionally, a plurality of spacers configured to fit onto prongs of a garden tool. The openings in the elongated tube configured to receive the prongs of the garden tool after which the elongated tube is pushed against the spacers, if used, and the end caps tightened against the outer surface of outer prongs. The garden tool may then be pushed into the ground until the elongated tube is at ground level, punching holes into which seeds may be placed or washed.

DETAILED DESCRIPTION OF THE PREFERRED EMBODIMENT

The described features, structures, or characteristics of the invention may be combined in any suitable manner in one or more embodiments. In the following description, numerous specific details are provided to provide a thorough understanding of embodiments of the invention. One skilled in the relevant art will recognize, however, that the invention can be practiced without one or more of the specific details, or with other methods, components and so forth. In other instances, well-known structures, materials, or operations are not shown or described in detail to avoid obscuring aspects of the invention.

Figure 1:
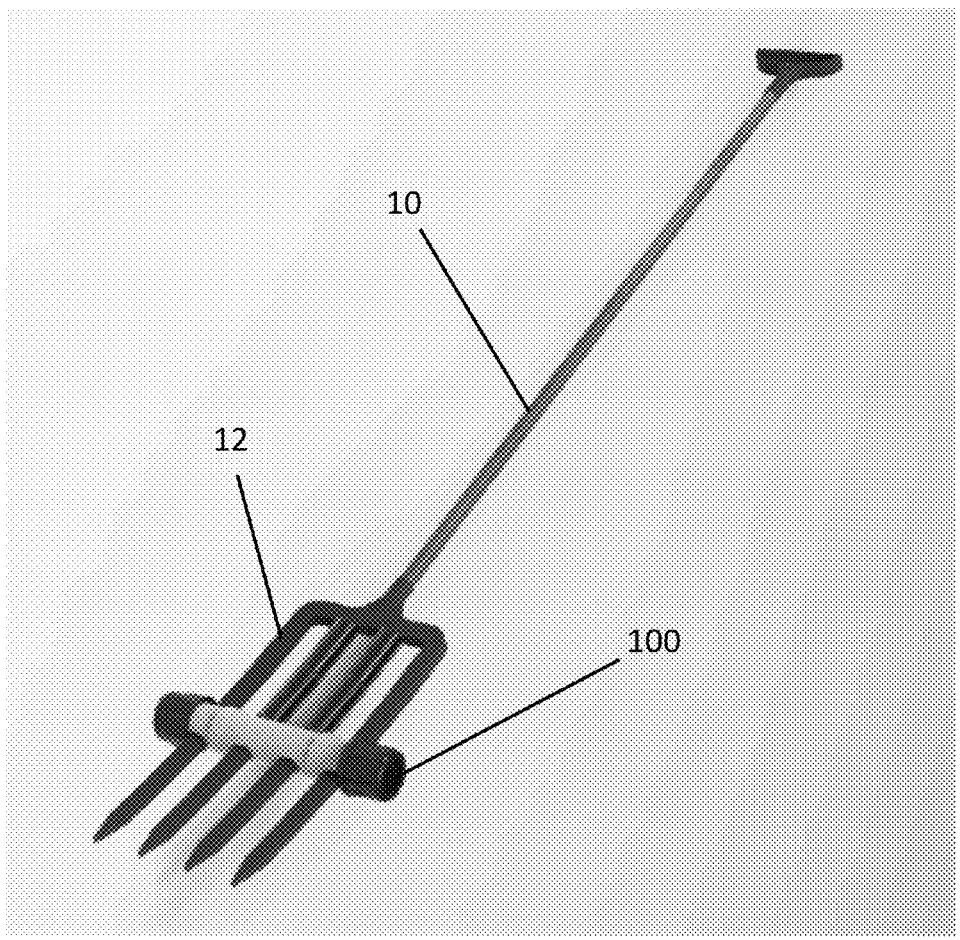
FIG. 1 illustrates an embodiment of an adapter system of the present invention mounted on a gardening tool, such as a pitch fork.
Figure 2:
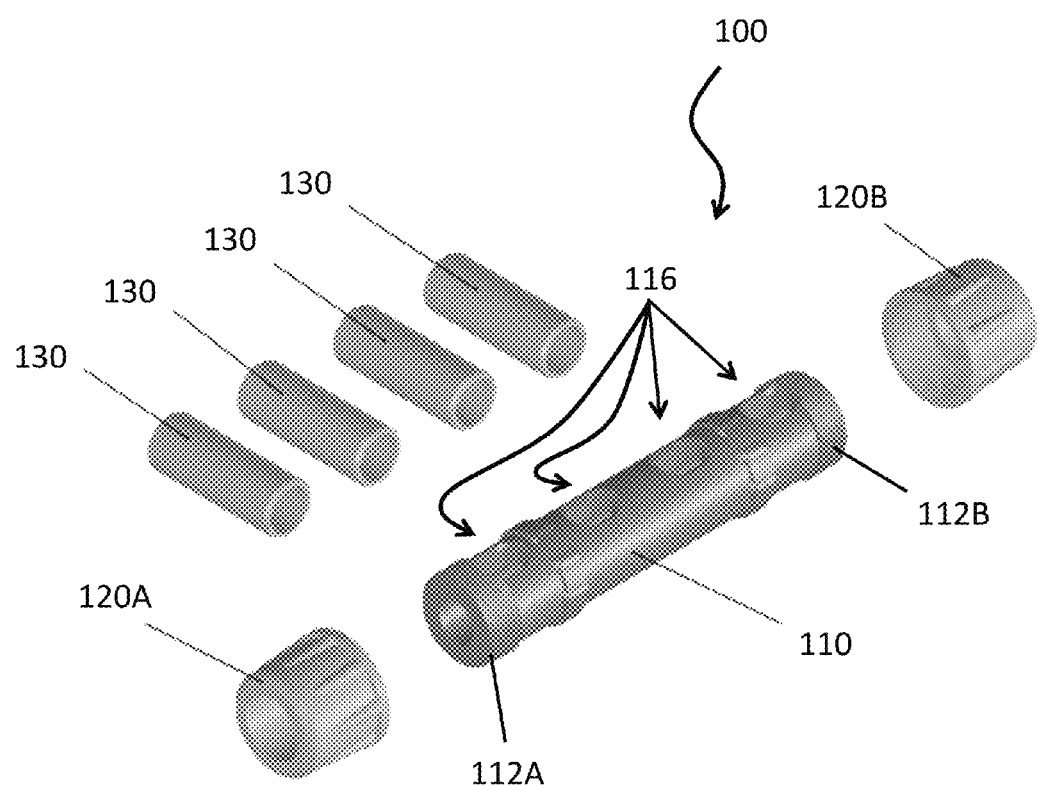
FIG. 2 is an exploded view of the adapter system of FIG. 1.

FIG. 1 illustrates an embodiment of an adapter system 100 of the present invention mounted on a gardening tool, such as on the prongs 12 a pitch fork 10. FIG. 2 is an exploded view of the adapter system 100, which includes an elongated tube 110 with male threads on the ends 112A, 112B to which end caps 120A, 120B, with corresponding female threads, are secured. The tube 110 also has spaced apart holes 116 formed therethrough. The system 100 may also include a set of spacers 130, four being shown in FIG. 2. Although there are four holes 116 shown in the FIGs., corresponding to the number of prongs 12 on the pitch fork 10, and the length of the tube 110 is longer than the width of the prongs 12, the tube 110 may be constructed with any number of holes 116 and in any length to fit tools having other numbers of prongs and of other widths. Similarly, while the end caps 120A, 120B are illustrated as having open ends, the ends may instead be closed.

Figure 3:
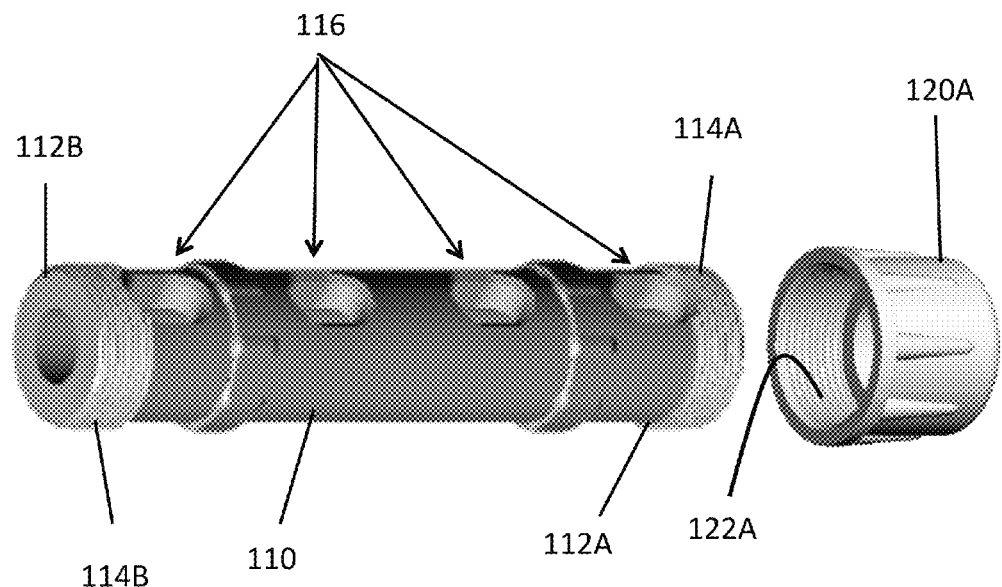
FIG. 3 illustrates the tube of the adapter system of FIG. 1 with an end cap removed.
Figure 4:
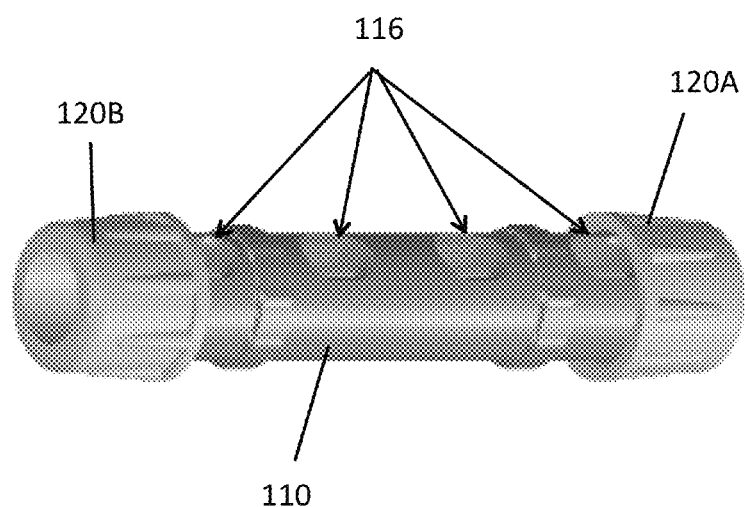
FIG. 4 illustrates the tube of the adapter system of FIG. 3 with the end cap in place.

FIG. 3 is a close-up view of the tube 110 with the end cap 120A removed from the end 112A. Visible in the FIG. are the threads 114A, 114B on the outside of the ends 112A, 112B of the tube 110 and the threads 122A on the inside of the end cap 120A. FIG. 4 is a close-up view of the tube 110 with both end caps 120A, 120B secured onto the ends 112A, 112B of the tube 110.

Figure 5:
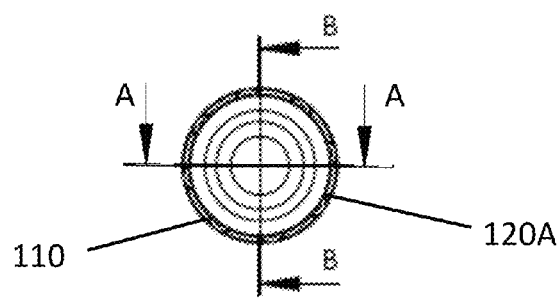
FIG. 5 is an end view of the tube and end cap of FIG. 4.
Figures 6, 7:
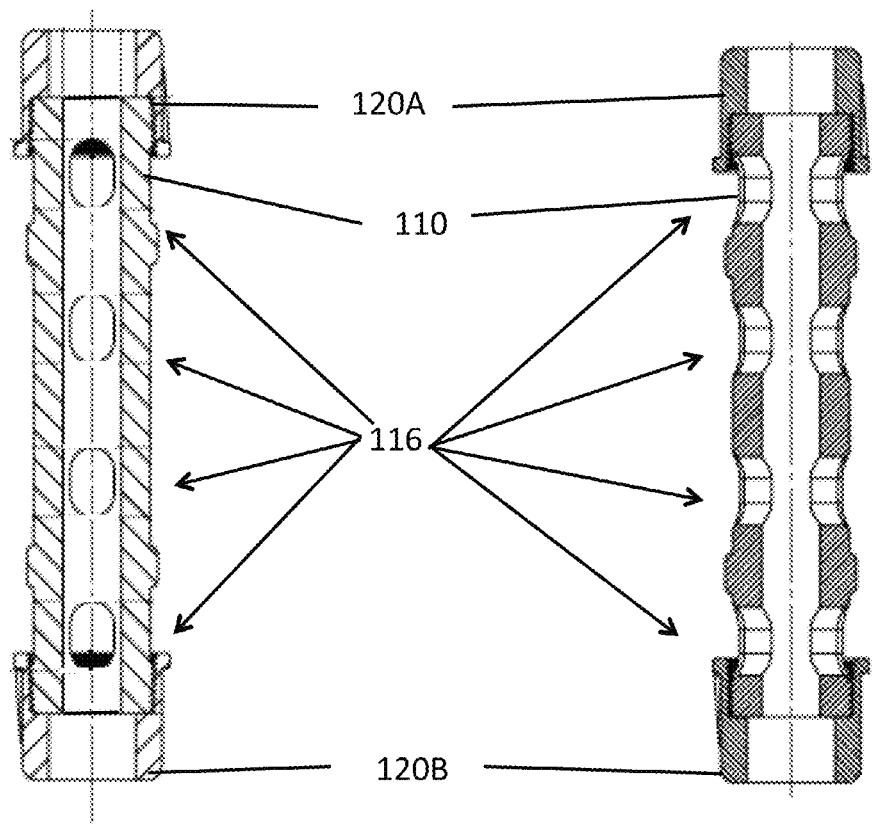
FIG. 6 is a cross-sectional view of the tube and end cap taken along section A-A of FIG. 5.
FIG. 7 is a cross-sectional view of the tube and end cap taken along section B-B of FIG. 5.

FIG. 5 is an end view of the tube 110 and end cap 120A. FIG. 6 is a cross-sectional view of the tube and end cap taken along section A-A of FIG. 5 and FIG. 7 is a cross-sectional view taken along section B-B.

The following dimensions represent the embodiment of the adapter system 100 illustrated in the FIGs. and are not critical to the practice of the present invention. The dimensions are not intended to be limiting but, instead, are provided for illustrative purposes only. The tube 110 may be 7.75" long with an outer diameter of 1.25" and an inner diameter of 0.75". The threads on the ends 112A, 112B and inside the end caps 120A, 120B may extend in 0.625" from the ends and have a pitch of 11.5 threads per inch. To fit the prongs 12 of the pitch fork 10, the openings 116 may be 0.875" long and 0.5625" wide and spaced 1.063" apart. The spacers 130 may be tubing 2.6" long, have an outer diameter of 1.0", and an inner diameter of 0.813". It will be appreciated that adapter systems for tools having different prong configurations will have other configurations, possibly including a different number of holes 116.

Figure 8:
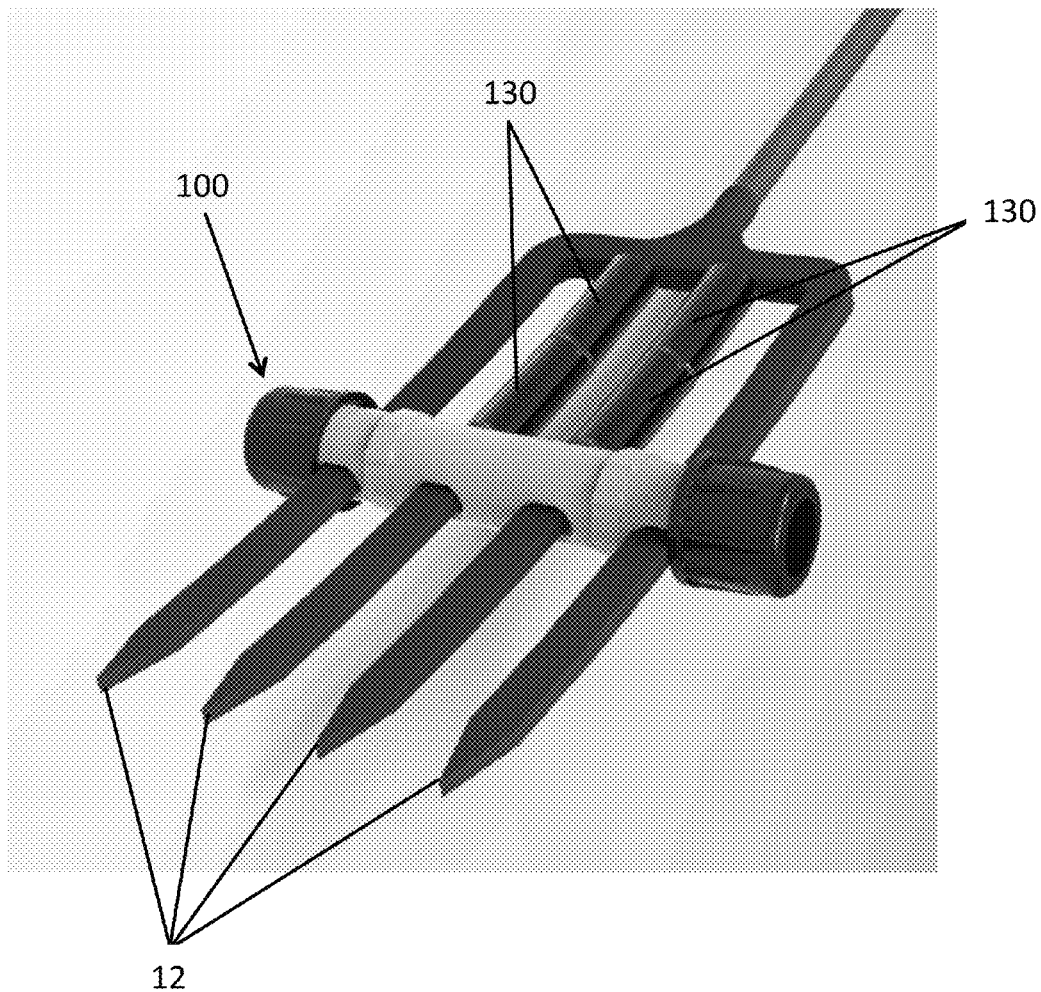
FIG. 8 is a close-up view of the adapter system of FIG. 1 mounted on a gardening tool, such as a pitch fork.

Turning to FIG. 8, to mount the system 100 onto a tool, such as the pitch fork 10, the end caps 120A, 120B, may either be screwed loosely onto the ends 112A, 112B of the tube 110 or left off. For additional optional support, at least two of the prongs 12 may be inserted through the spacers 130. Depending on the depth of the holes that are desired, more than one spacer 130 may be stacked onto each prong 12. While the spacers 130 may be placed on any of the prongs 12, it is preferable that they be spaced symmetrically on opposite sides of the center line of the prongs 12 to ensure that the tube 110 is mounted evenly. Thus, in FIG. 8, two spacers 130 are stacked onto the two inner two prongs 12. If deeper holes are desired, just one spacer 130 may be used on each prong 12. Conversely, if shallower holes are desired, three or more spacers 130 may be used on each prong 12.

After the desired number of spacers 130, if any, are in place, the prongs 12 are inserted through the holes 116 in tube 110 and the tube 110 moved to a desired distance from the ends of the prongs 12, corresponding to the depth of the holes to be made. If spacers 130 are used, the tube 110 is pressed firmly against the spacers 130. The end caps 120A, 120B are then tightened against the outside surfaces of the two outside prongs 12. In this way, the tube 110 will remain securely in place on the prongs 12.

To use the system 100, the gardener pushes the prongs 12 into the ground until the tube 110 is at ground level, acting as a stop. When used, the spacers 130 provide additional resistance to prevent the tube 110 from slipping from the desired position on the prongs 12. The gardener may also push the tube 110 slightly against the ground to create an indentation or channel, useful for funneling seeds into the holes. Once the holes have been punched, the seeds may be sown.

The adapter system 100 easily attaches to and detaches from a common garden tool. It allows the gardener to punch holes of uniform depth for seed to wash into, facilitating the growth of deeper root systems and increasing the drought-resistance of the grass or other plant, even while using less water.

The description of the present invention has been presented for purposes of illustration and description, but is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A garden tool adapter for punching holes for seeds, comprising:
   an elongated tube having male threads on each end and a first opening formed therethrough adjacent each end and perpendicular to a length of the elongated tube; and
   a pair of end caps having female threads corresponding to the male threads, each end cap having an inner end screwable onto an end of the elongated tube, the inner ends at least partially obstructing the first openings when the caps are screwed onto the ends of the elongated tube;
   wherein:
   the first openings through the elongated tube are configured to receive the prongs of the garden tool through the first openings when the elongated tube is mounted onto the garden tool and moved to a desired distance from the ends of the prongs; and
   the end caps are tightenable on the ends of the elongated tube against the outer surface of outer prongs, whereby the elongated tube is secure on the outer prongs.

2. The garden tool adapter of claim 1, further comprising a plurality of spacers configured to fit onto prongs of a garden tool before the elongated tube is mounted onto the garden tool to maintain the elongated tube at the desired distance from the ends of the prongs when pressure is applied to the elongated tube.

3. The garden tool adapter of claim 1, further comprising at least one second opening formed through the elongated tube between the first openings and perpendicular to the length of the elongated tube to receive at least one prong between the outer prongs of the garden tool.

4. A method of punching holes in the ground in which seeds are to be planted, comprising:
   inserting the prongs of the garden tool through openings formed through an elongated tube adjacent each end and perpendicular to a length of the elongated tube, the ends being threaded;
   moving the elongated tube along the prongs to a desired distance from the ends of the prongs;
   tightening threaded end caps onto the threaded ends of the elongated tube against the outer surface of the prongs, whereby the elongated tube is secure on the prongs; and
   pushing the garden tool into the ground until the elongated tube is at ground level to punch holes into which seeds may be placed or washed.

5. The method of claim 4, further comprising:
   placing a plurality of spacers onto prongs of a garden tool before the prongs of the garden tool are inserted into the openings of the elongated tube;
   pushing the elongated tube against the spacers; and
   tightening the end caps to maintain the elongated tube at the desired distance from the ends of the prongs when the garden tool is pushed into the ground.

* * * * *